United States Patent [19]

Ashtiani-Zarandi et al.

[11] Patent Number: 4,890,877
[45] Date of Patent: Jan. 2, 1990

[54] ENERGY ABSORPTION SYSTEM FOR VEHICLE DOOR AND METHOD OF MAKING

[75] Inventors: Mansour Ashtiani-Zarandi, Birmingham; Youssef Tishbi, Farmington Hills; Jeffrey A. Welch, Troy, all of Mich.

[73] Assignee: General Motors Corporation, Detroit, Mich.

[21] Appl. No.: 217,803

[22] Filed: Jul. 12, 1988

[51] Int. Cl.$^4$ .............................................. B60J 5/04
[52] U.S. Cl. ..................................... 296/146; 296/153; 188/371; 428/166; 428/179
[58] Field of Search ................ 296/153, 146; 428/166, 428/180, 116, 119, 179; 188/371, 377, 376

[56] References Cited

U.S. PATENT DOCUMENTS

| 997,994 | 7/1911 | Hahn | 428/179 |
|---|---|---|---|
| 3,231,454 | 1/1966 | Williams | 428/174 |
| 4,267,223 | 5/1981 | Swartz | 428/172 |
| 4,409,274 | 10/1983 | Chaplin et al. | 428/112 |
| 4,495,237 | 1/1985 | Patterson | 428/180 |
| 4,507,348 | 3/1985 | Nagata et al. | 428/172 |
| 4,588,631 | 5/1986 | Clark | 428/166 |
| 4,631,221 | 12/1986 | Disselbeck et al. | 428/166 |
| 4,783,114 | 11/1988 | Welch | 296/153 |
| 4,786,100 | 11/1988 | Kleemann et al. | 296/153 |

Primary Examiner—Robert R. Song
Attorney, Agent, or Firm—Charles E. Leahy

[57] ABSTRACT

The method for making an energy absorbing panel comprises the steps of coating a stretchable lightweight fabric with resin, molding the resin coated fabric into a generally planar sheet having a plurality of spaced apart conical projections rising from the planar sheet, cutting the fabric to provide molded panels in a size and shape of the desired energy absorbing panel structure, cutting adhesive coated planar sheet material in a size and shape of the desired energy absorbing panel structure to provide interface panels, interleaving the molded panels and the adhesive coated interface panels to the desired thickness of the energy absorbing panel structure, and then curing the adhesive to attach the panels and thereby form the energy absorbing structure. Upon the imposition of a force against the energy absorbing structures, the resin rigidified projections collapse to absorb energy. The energy absorbing structure is mounted on a vehicle door above the arm rest and below the window opening between the door trim panel and the door inner panel to absorb energy in the event that the occupant contacts the door inner panel.

1 Claim, 3 Drawing Sheets

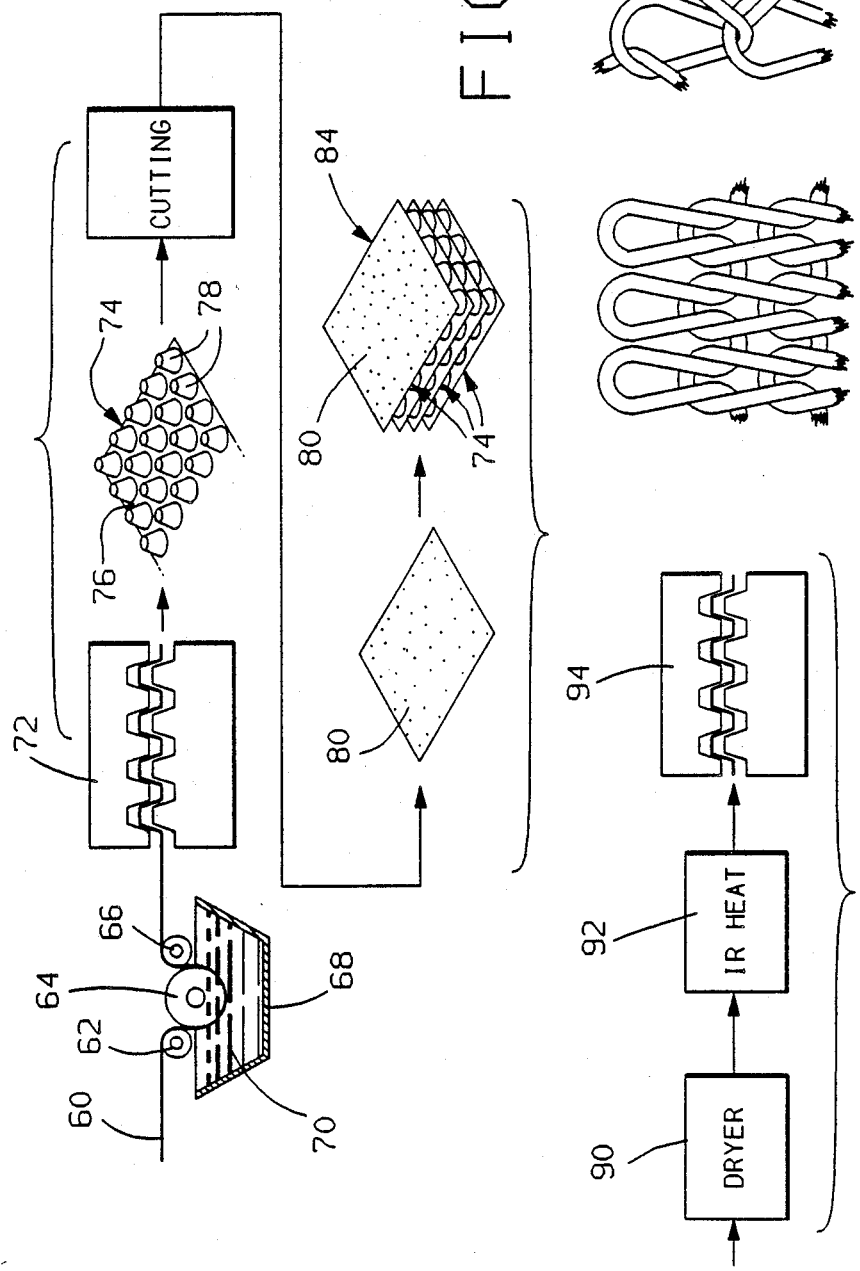
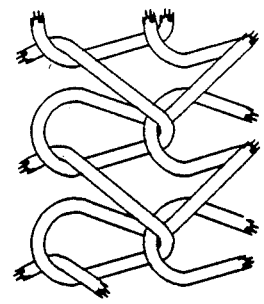
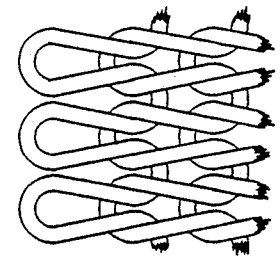

ENERGY ABSORPTION SYSTEM FOR VEHICLE DOOR AND METHOD OF MAKING

The invention relates to an energy absorbing system and method of making and more particularly to an energy absorber comprised of molded resin coated fabric sheets adhered together and mounted on a vehicle door for energy absorption.

BACKGROUND OF THE INVENTION

It is well known in motor vehicles to provide a decorative door trim panel assembly on the inner panel of the door. It is also known to provide an arm rest on the door and projecting inboard from the door trim panel to provide a convenient rest for the occupant's arm.

The prior art has recognized that the door trim panel may be comprised of a foam material which collapses and absorbs energy upon imposition of the lateral force thereagainst. The prior art has also recognized that the arm rest may be comprised of a foam or honeycomb structure which will yield laterally upon imposition of a force thereagainst.

U.S. patent application Ser. No. 117,073, filed Nov. 5, 1987, assigned to the assignee of this invention, relates to a vehicle door having an arm rest construction which collapses into a cavity in the door upon the imposition of a lateral force thereagainst.

The present invention relates to a new and improved energy absorbing construction, particularly suited for a vehicle door, and comprised of lightweight and economical textile materials.

SUMMARY OF THE INVENTION

According to the invention, the method for making an energy absorbing panel comprises the steps of coating a stretchable lightweight fabric with resin, molding the resin coated fabric into a generally planar sheet having a plurality of spaced apart conical projections rising from the planar sheet, cutting the fabric to provide molded panels in a size and shape of the desired energy absorbing panel structure, cutting adhesive coated planar sheet material in a size and shape of the desired energy absorbing panel structure to provide interface panels, interleaving the molded panels and the adhesive coated interface panels to the desired thickness of the energy absorbing panel structure, and then curing the adhesive to attach the panels and thereby form the energy absorbing structure. Upon the imposition of a force against the energy absorbing structures, the resin rigidified projections collapse to absorb energy.

The energy absorbing structure is mounted on a vehicle door above the arm rest and below the window opening between the door trim panel and the door inner panel to absorb energy in the event that the occupant contacts the door inner panel.

Accordingly, the object, feature and advantage of the invention resides in the method of making an energy absorbing structure by molding resin coated textile material to have projections and then adhesively bonding planar interface sheets between such molded panels to provide a structure which absorbs energy by collapse of the resin rigidified projections.

Another feature, object and advantage of the invention resides in the mounting of such a resin rigidified textile energy absorbing structure in the vehicle door behind the door trim panel and in the region above the arm rest below the window opening.

BRIEF DESCRIPTION OF THE DRAWINGS

These and other features, objects and advantages of the invention will become apparent upon consideration of the description of the preferred embodiment and the appended drawings in which:

FIG. 8a is a schematic representation of the method of making the energy absorbing structure using a thermoset resin to coat the stretchable textile fabric;

FIG. 8b is an alternate method for forming the energy absorbing structure utilizing a thermoplastic resin to coat the stretchable textile fabric;

FIG. 9 shows a highly stretchable weft knit fabric suitable for resin coating and molding to make the molded panels; and FIG. 10 is a highly stretchable warp knit fabric suitable for resin coating and molding to make the molded panels.

DESCRIPTION OF THE PREFERRED EMBODIMENT

Figure 1:
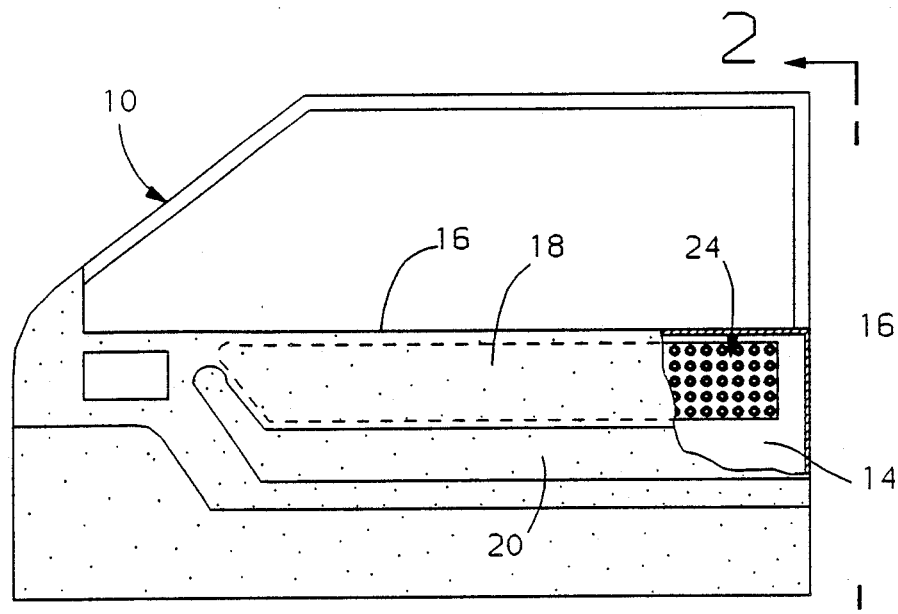
FIG. 1 is a side elevation view of a vehicle door having parts broken away and in section to show the energy absorber of this invention.
Figure 2:
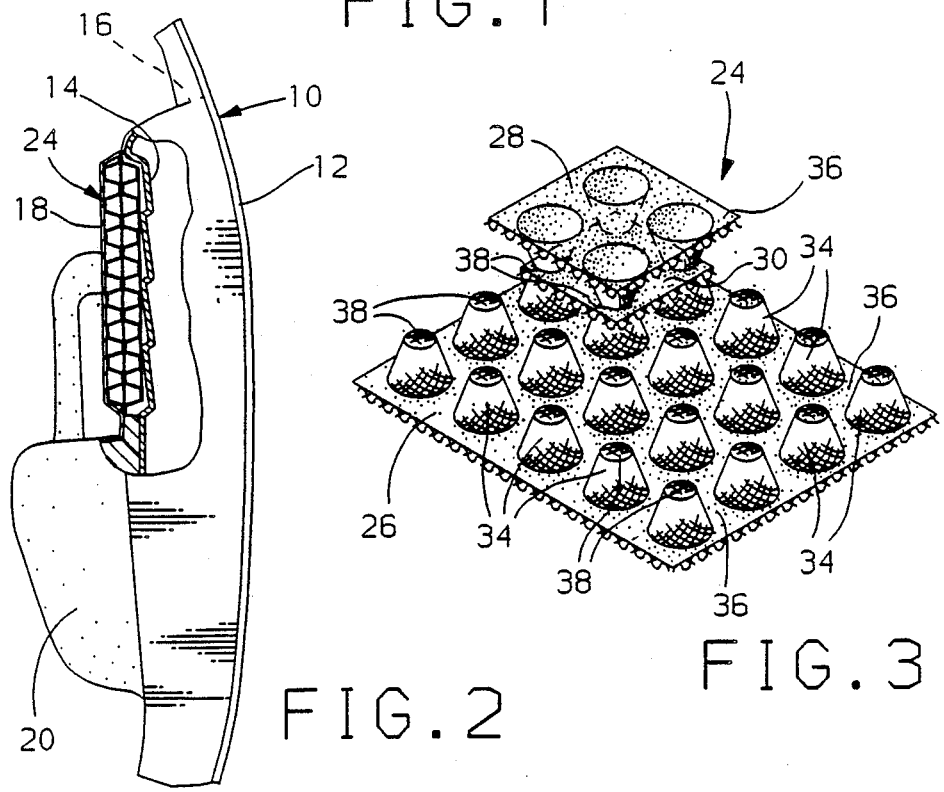
FIG. 2 is a sectional view taken in the direction of arrows 2—2 of FIG. 1.

Referring to FIGS. 1 and 2, a typical vehicle door 10 is shown and includes an outer panel 12 and an inner panel 14, which are spaced apart to define a vehicle door structure carrying a window regulator mechanism, door latch, and other components of a vehicle door. The inner and outer panels define a window opening 16.

A door trim panel 18 is formed of a suitable material such as pressed hardboard or plastic and is covered with a suitable decorative material such as vinyl, leather, cloth, carpeting or the like. The door trim panel 18 is attached to the door inner panel 14. An arm rest structure 20 is also mounted on the door inner panel 14.

Reference may be had to U.S. patent application Ser. No. 117,073 filed Nov. 5, 1987, and assigned to the assignee of this invention for disclosure of a suitable energy absorbing arm rest structure.

An energy absorbing structure 24 is also interposed between the door trim panel 18 and the door inner panel 14 in the region above the arm rest 20 and below the window opening 16.

Figure 3:
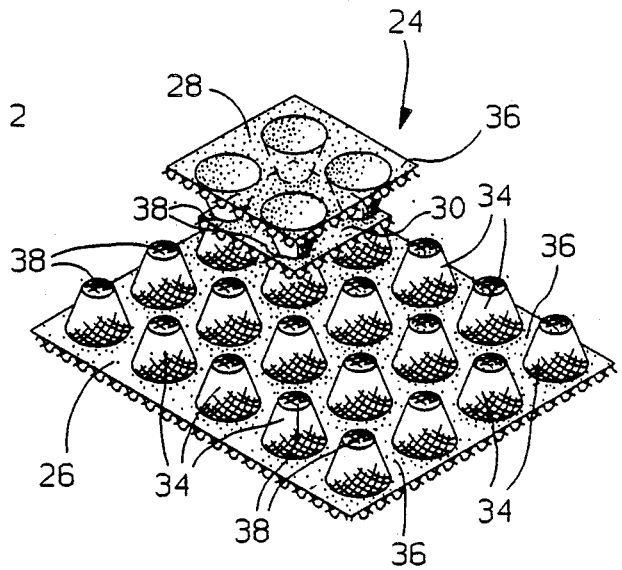
FIG. 3 is a perspective view showing a molded energy absorbing panel comprised of resin coated textile.

FIG. 3 shows a perspective view of the energy absorbing structure 24. Energy absorbing structure 24 is comprised of a molded textile panel 26 and a molded textile panel 28 with an interface sheet 30 interposed therebetween. The molded panels 26 and 28 are comprised of a fabric of flexible highly stretchable lightweight textile material. The stretchable lightweight fabric may be made of fibers such as nylon or polyester. The fabric is coated with a resin and molded to provide a plurality of spaced apart conical shaped projections 34 which are stretched to rise from a generally planar base 36. The conical projections 34 are preferably truncated to provide flat top surfaces 38 which are generally parallel with respect to the planar base 36.

The molded panels 26 and 28 are arranged with respect to each other as shown in FIGS. 2 and 3 with the flat top surfaces 38 juxtaposed to one another and the interface sheet 30 interposed between the flat top surfaces 38. The interface sheet 30 is coated with a suitable adhesive and adheres to the flat top surfaces 38. The assembled construction of the molded panels 26 and 28 and the interface sheet 30 is shaped to fit within the confines of the region above the arm rest 20 and below the door opening 16. In the event that a lateral force is applied against the door trim panel 18, the energy absorbing structure 24 will collapse and deform, thereby absorbing energy.

Figure 4:
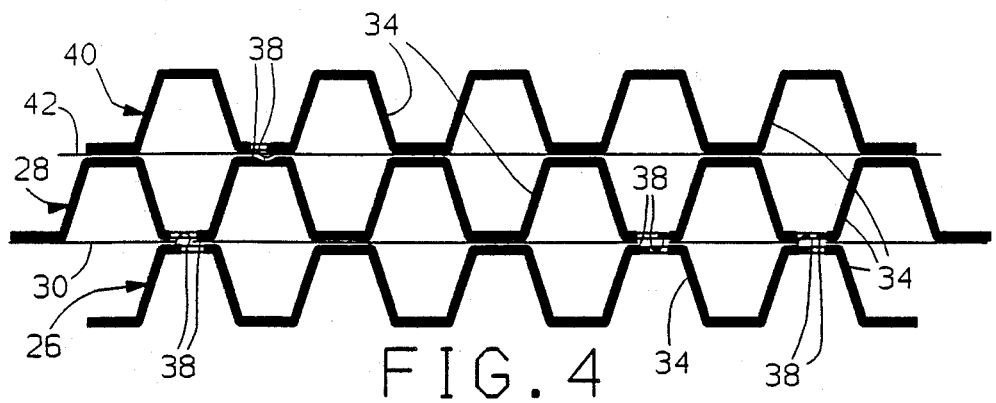
FIG. 4 schematically represents the preferred arrangement for assembling the molded resin coated textile panels with adhesively coated interface panels to define the energy absorbing structure.

Referring to FIG. 4, there is shown a schematic cross-section through a suitable energy absorbing structure similar to that of FIGS. 2 and 3. It is seen that the molded panel 26 and the molded panel 28 and the interface sheet 30 are arranged in position with respect to each other so that their respective flat top surfaces 38 of the conical projections 34 register with one another. An additional molded panel 40 and interface sheet 42 is also shown.

Figure 5:
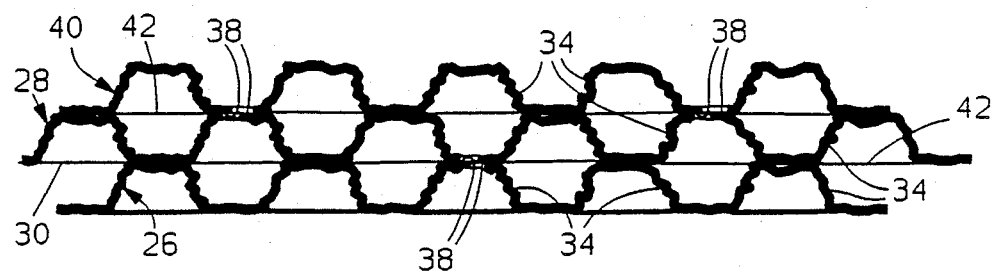
FIG. 5 schematically represents the energy absorbing panel of FIG. 4 under energy absorbing deformation.

As seen in FIG. 5, the onset of a load imposed on the energy absorbing structure causes the projections 34 to collapse axially as the level of load imposed thereon exceeds the load sustaining capacity of the resin which stiffens the fabric of the molded panels 26, 28 and 40. It will be appreciated that the interface sheets 30 and 42 are placed under tension during the imposition of the load and substantially retain their planar configuration as the projections 34 progressively collapse.

Figure 6:
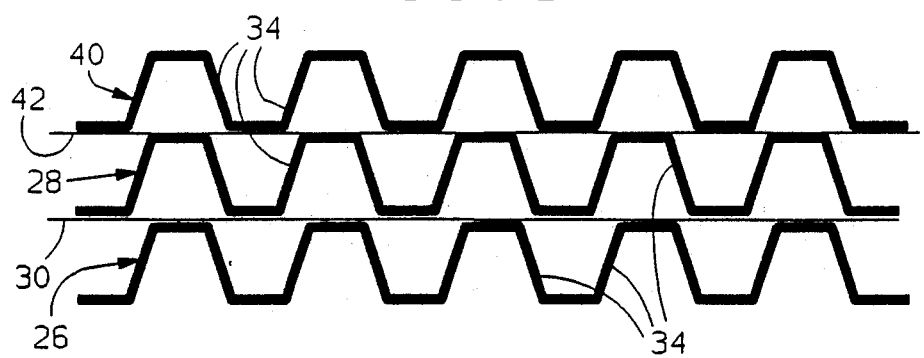
FIG. 6 is similar to FIG. 5 but showing an alternate arrangement of the molded resin coated textile panels with the planar interface panels.
Figure 7:
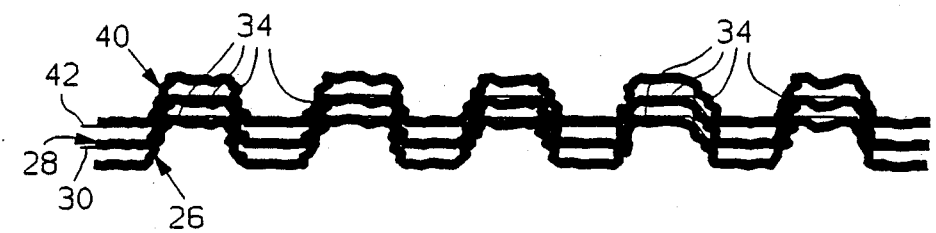
FIG. 7 is a schematic representation of the energy absorbing deformation of the energy absorbing structure of FIG. 6.

FIG. 6 shows an alternate arrangement of the molded panels 26, 28 and 40 in which the molded parts are arranged with the projections 34 registered with one another in a nesting fashion so that the collapse, as shown in FIG. 7, results in the collapse of the molded panels with the projections nesting progressively upon one another as permitted by the collapse of projections 34 and yielding of the interface sheets 30 and 42. Accordingly, the energy absorption is provided by the composite collapsing of both the projections 34 and the interface sheets 30 and 42 therebetween.

Referring to FIG. 8a, there is shown a schematic representation of the preferred method for making the energy absorbing structure 24.

The highly stretchable fabric 60 is routed around feed roller 62, center 64 and squeeze off roller 66 and dipped in a trough 68 filled with thermoset resin 70. The quantity of resin 70 impregnated on the stretchable fabric 60 is precisely controlled by controlling the space between the principal roller 64 and the squeeze off roller 66. Examples of a suitable thermoset resin include an unsaturated polyester, a vinyl ester, an epoxy, or methyl methacrylate. After the stretchable fabric 60 is coated with the resin 70, the resin coated fabric passes through a heated mold 72 which shapes the stretchable fabric 60 and cures the resin to form the molded panel 74 having a generally planar base 76 and a plurality of projections 78. The mold stretches the fabric to make the projections and the curing of the resin rigidifies the stretched fabric to retain the shape of the projection. The stretching of the fabric to form the projections further increases the spacing between the threads of yarn so that the projections are porous. The molded panel 74 is then cut to the shape of the desired energy absorbing structure in order to properly fit within the confines of the vehicle door.

Sheets of relatively stiff material are then cut to form the interface panel 80. The interface panel 80 may be thin sheets of plastic, metal, foam, paper, or fabric. The interface panel 80 is coated with a suitable adhesive by spraying, dipping, brushing, or other process.

The energy absorbing structure 84 is assembled by stacking the molded panels 74 with the interface panels 80 interleaved between the molded panels 74. The curing of the adhesive coating the interface sheets 80 bonds the interface sheets 80 and molded panels 74 to provide the finished energy absorbing structure 84.

FIG. 8b shows an alternate process which may be employed if it is desired to use an aqueous dispersion thermoplastic resin for coating the highly stretchable fabric. The fabric exiting the resin coater is passed through dryer 90 is a relaxed state to remove the water from the thermoplastic resin. If desired, the resin coated fabric may then be wound upon a reel for storage or for transport to a remote fabricating plant. The resinated fabric may then subsequently be passed through an infrared heater 92 to soften the resin before molding in a cold molder 94. After molding, the molded panel would be processed in the same fashion as shown in FIG. 8a. Suitable aqueous dispersion thermoplastic resins include polyurethane, acrylic and others.

FIGS. 9 and 10 show two suitable fabric structures for the highly stretchable fabric. FIG. 9 shows a weft knit fabric. FIG. 10 shows a warp knit fabric. The particular knit fabric may use a yarn of stretch polyester or nylon having 70 to 600 denier. The fabric is capable of stretching in the range of approximately 150% to 350%. This stretching of the fabric is important in order to enable the molding of the fabric to provide the porous projections. The stretch may be provided partly by the stretch of the yarn and partly by the knit geometry of the fabric.

A suitable resin may have room temperature properties of tensile strength of 12,300 psi, elongation of four to five percent, flexural strength of 22,400 psi and a heat distortion temperature of 220°-230° F.

It will be understood that the energy absorbing characteristics of the energy absorbing structure of this invention may be determined by controlling any of the several variables involved in the process of FIGS. 8a and 8b. For example, the type of resin utilized and the amount of resin coated onto the stretchable fabric will determine the extent to which the conical projections are rigidified and the porosity of the projections. The thickness and strength of the interface sheet and its adhesive will also determine the collapse of the energy absorbing structure.

Furthermore, the energy absorption is determined by the shape and dimension, the population, the porosity, the texture, and the stiffness of the projections. The projection is not limited to the circular conical shape shown in the preferred embodiment, but could have other shapes as well. For example, the projection could be elongated in one direction and have an elliptical or other shape. In addition, the molded panels may be arranged with respect to each other as shown in FIG. 4, or as shown in FIG. 6, or in any number of other configurations. For example, the molded panels may be arranged with the projections staggered with respect to one another so that the flat top surface of the conical projection of one molded panel will be juxtaposed with the planar base of the next adjacent molded panel. In addition, the energy absorbing characteristic will be determined by the number of molded panels which are stacked together to define the energy absorbing structure.

Thus it is seen that the invention provides a new and improved energy absorbing structure for a vehicle door, together with the method for making such an energy absorbing structure in which the energy absorbing structure is constructed of lightweight economical materials.

We claim:
1. An energy absorbing vehicle door comprising:
inner and outer panels joined together in spaced apart relation and having upper marginal portions defining a window opening;
an arm rest mounted on the inner panel in spaced relation beneath the window opening;
a door trim panel mounted on the inside of the inner panel between the window opening and the arm rest and concealing the inner panel;
and an energy absorbing structure interposed between the door trim panel and the inner panel beneath the window opening and above the arm rest and including a plurality of energy absorbing sheets of stretchable lightweight textile fabric having a generally planar base and a plurality of resin rigidified spaced apart conical shaped projections stretched from the base, and an interface sheet of generally planar material interleaved between the adjacent sheets of stretchable lightweight textile fabric and adhesively secured thereto to define an energy absorbing structure whereby the application of a predetermined load thereto causes the collapse of the resin rigidified stretched projections and absorbs energy.

* * * * *